United States Patent [19]

Jacobsen et al.

[11] Patent Number: 5,005,600
[45] Date of Patent: Apr. 9, 1991

[54] SERVOVALVE APPARATUS FOR USE IN FLUID SYSTEMS

[75] Inventors: Stephen C. Jacobsen; Edwin K. Iversen; David F. Knutti, all of Salt Lake City, Utah

[73] Assignee: Sarcos Group, Salt Lake City, Utah

[21] Appl. No.: 472,701

[22] Filed: Jan. 31, 1990

[51] Int. Cl.⁵ ............................................. G05D 16/20
[52] U.S. Cl. .......................................... 137/83; 91/3
[58] Field of Search ..................... 137/83, 625.64; 91/3

[56] References Cited

U.S. PATENT DOCUMENTS

| | | | |
|---|---|---|---|
| 2,990,839 | 7/1961 | Ray | 137/83 X |
| 3,011,505 | 1/1961 | Reip | 137/83 OX |
| 3,081,787 | 3/1963 | Menlendyk | 137/83 |

*Primary Examiner*—Alan Cohan
*Attorney, Agent, or Firm*—Thorpe, North & Western

[57] ABSTRACT

A servovalve apparatus for use in fluid systems which comprises a flexible fluid conduit and a conductive coil which surrounds at least a portion of the conduit adjacent its upstream end. An armature is secured to the flexible conduit so as to be adjacent the conductive coil. Two permanent magnets, preferably formed of a rare earth metal material, are provided adjacent the armature on opposite sides thereof, the magnets being positioned such that one magnet presents a north magnetic pole facing the armature and the other magnet presents a south magnetic pole facing the armature. A receiving plate is provided adjacent the downstream end of the flexible conduit, the receiving plate having one or more channels formed therein for receiving fluid from the conduit. Preferably, the channels in the receiving plate originate within and communicate with a concave socket in the receiving plate which has substantially the same radius of curvature as the path over which the downstream end of the flexible conduit moves during flexure.

6 Claims, 1 Drawing Sheet

SERVOVALVE APPARATUS FOR USE IN FLUID SYSTEMS

BACKGROUND

1. The Field of the Invention

This invention relates to valve apparatus and, more specifically, to a novel servovalve apparatus for use in fluid systems to selectively direct or "port" fluid flow.

2. The Background Art

Fluid systems are frequently used in mechanical devices as a means of controlling or positioning various mechanical components. As used herein, the term "fluid" is used generally to refer to any substance which is capable of flowing under pressure through a conduit. Thus, the term "fluid" encompasses both gasses and liquids, and the general term "fluid systems" is intended to include both pneumatic and hydraulic systems.

A fluid system typically comprises a pump for pressurizing the fluid which is then used to provide the force necessary to position and/or control a desired mechanical component. For example hydraulic systems are often used to control shovels or scoops on heavy construction machinery. Similarly, pneumatic systems are frequently employed in the field of robotics to control the position and movement of a desired object, such as, for example, a robotic arm.

Appropriate fluid controlling valves are essential for the proper operation of virtually all fluid systems. For example, a valve may be used to direct pressurized fluid first to one side and then the other of a plunger which is slidable positioned within an elongated housing. The operation of the valve thus controls the flow of pressurized fluid to each side of the plunger and thereby the position of the plunger within the housing.

Examples of some of the more commonly used valves in fluid systems are poppet valves (which control fluid flow by a "pinching" action) and spool valves (which control fluid flow by selective alignment of fluid channels in a spool with orifices in a sleeve in which the spool is slidable disposed). Poppet valves are generally not well suited for servovalve applications, typically have a significant lag time in their operation, and many times have leakage problems. Spool valves require very tight tolerances to avoid leakage between the spool and sleeve thus making them expensive to manufacture and maintain. Also, because of the tight tolerances, significant frictional forces can be generated causing wear in the valves.

A valve having somewhat more recent origin is the jet pipe valve, often called a flow-dividing valve. A jet pipe valve comprises a fluid pipe having a small orifice on its downstream end. Fluid flows through the pipe at a substantially constant rate, and the small orifice produces a "jet" of fluid out of the end of the pipe. The pipe is provided with a suitable actuator device which selectively directs the fluid jet toward one or more nearby fluid paths. By appropriately positioning the fluid pipe, the ratio of fluid flowing into the nearby fluid paths can be controlled.

Conventional jet pipe valves suffer from significant fluid leakage and are quite inefficient in their use of fluid power. The operation of jet pipe valves is also somewhat unpredictable at high pressures and high fluid flow rates. Consequently, prior art jet pipe valves typically incorporate small orifices (less than 0.005") and operate at fluid flow rates on the order of 0.1 gallons per minute. Conventional jet pipe valves are also typically quite bulky. Due to the significant tangential forces present in jet pipe valves, bulky mechanical actuators are often used. Torsional springs and other balancing mechanisms are also often employed in jet pipe valves in an effort to improve valve operation. Consequently, prior art jet pipe valves are often very difficult to properly maintain and adjust during use.

BRIEF SUMMARY AND OBJECTS OF THE INVENTION

In view of the foregoing, it is a primary object of the present invention to provide a servovalve apparatus for use in fluid systems which is capable of providing high power output and operating under high fluid flow rates but which does not require the maintenance of tight tolerances between the valve's component parts.

It is an additional object of the invention to provide a substantially frictionless-operating servovalve apparatus.

It is another object of the invention to provide a servovalve apparatus in which fluid flow forces are reduced.

It is also an object of the present invention to provide an efficient servovalve apparatus for use in fluid systems which is simple in construction and inexpensive to manufacture and maintain.

It is a further object of the invention to provide a servovalve apparatus for use in fluid systems which is both lightweight and compact in size.

Consistent with the foregoing objects, the present invention is directed to a novel servovalve apparatus for use in fluid systems which comprises an elongate flexible valve stem or element having a fixed end and a free end which is moveable back and forth along a generally arcuate path. The servovalve apparatus also includes fluid carrying structure for directing a fluid stream toward the free end of the valve element. A receiving plate is provided to define a generally arcuate surface area adjacent the arcuate path over which the free end of the valve element moves. The receiving plate has at least one fluid channel terminating at a location along the arcuate surface area. A porting element is disposed on the free end of the valve element to guide or port the fluid stream into the fluid channel when the free end is deflected or moved to a certain position over the receiving plate. Apparatus for selectively deflecting the free end of the valve element to the said certain position (and out of said certain position) is also provided.

The apparatus for selectively deflecting the free end of the valve element could, in accordance with one aspect of the invention, include an armature affixed to the valve element near the free end thereof, a conductive coil which surrounds at least a portion of the valve element adjacent its free end, and a magnet assembly disposed adjacent the armature on at least one side thereof. A source of electrical current supplies current to the conductive coil to magnetize the armature and thus cause it to either be attracted toward or repelled from the magnet assembly. In this manner, the porting element may be selectively positioned over the fluid channel in the receiving plate or moved away therefrom.

These and other objects and features of the present invention will become more fully apparent from the following description and appended claims, taken in conjunction with the accompanying drawings.

DETAILED DESCRIPTION OF THE PREFERRED EMBODIMENTS

The presently preferred embodiments of the invention will be best understood by reference to the drawings, wherein like parts are designated with like numerals throughout.

Figure 1:
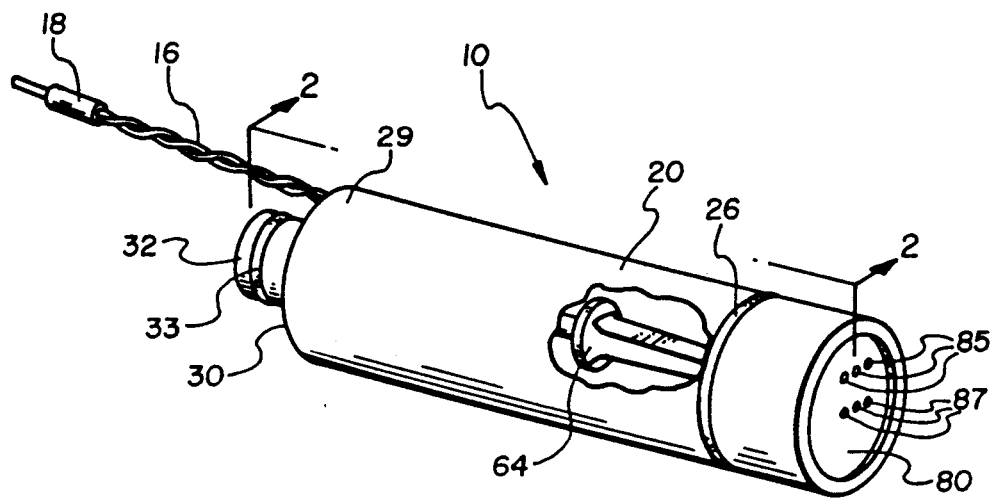
FIG. 1 is a perspective partially cutaway view of one presently preferred embodiment of the servovalve apparatus of the present invention.
Figure 2:
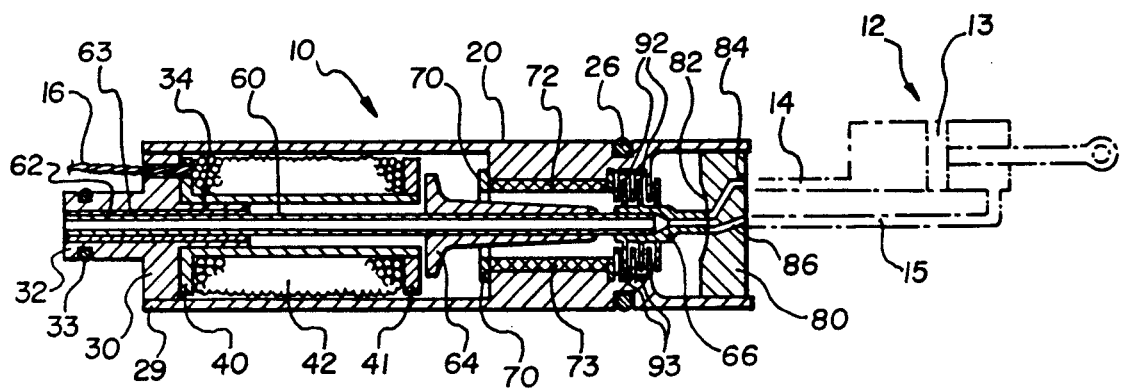
FIG. 2 is vertical cross-sectional view of the embodiment of FIG. 1 taken along lines 2—2 of FIG. 1 which also includes a schematic illustration of an actuator device shown in broken lines.

One presently preferred embodiment of the servovalve apparatus of the present invention, designated generally at 10, is illustrated in FIGS. 1 and 2. As shown, servovalve 10 comprises a body 20 which may be formed of any suitable material. It is presently preferred that body 20 be formed of a soft magnetic material which is easy to machine and which has low hysteresis, such as, for example, silicon steel, leaded steel, or low carbon steel.

While body 20 could have a wide variety of different shapes and configurations, body 20 is illustrated herein as being substantially cylindrical. It is presently believed that the cylindrical configuration of body 20 facilitates the manufacture of servovalve 10, and is readily susceptible of being machined to accommodate the various component parts of servovalve 10, a described further below.

The upstream end 29 of body 20 is provided with an end plate 30, as illustrated in FIG. 2. End plate 30 may be formed of any suitable material, such as, for example, brass. End plate 30 is secured within the upstream end 20 of body 20 in some suitable manner such as by soldering or by means of an adhesive.

End plate 30 is provided with a nipple 32, as shown, which may be attached to a source of pressurized fluid using a conventional fluid tube (not shown). An 0-ring 33 preferably surrounds nipple 32 in a suitable groove to assist in sealing nipple 32 to the fluid tube.

Opposite nipple 32, end plate 30 is provided with a spindle 34. Spindle 34 and nipple 32 may advantageously be formed as an integral part of end plate 30. Significantly, nipple 32, end plate 30, and spindle 34 each have a bore therethrough which combine to form a substantially uniform, longitudinal passageway, the purpose of which will become more readily apparent from the discussion which follows.

A mandrel 40 is provided on spindle 34 of end plate 30. Mandrel 40 may be formed of any suitable material such as, for example, steel, and could be formed as an integral part of end plate 30 or as a separate element. A downstream end disk 41 of the mandrel is made of a non-magnetic material such as aluminum, plastic, etc. The mandrel 40 will be further discussed hereafter.

A suitable electrical conductor is wound around mandrel 40 so as to form a conductive coil. Any suitable electrical conductor may be used, such as, for example, #30 copper magnet wire. The ends of wire 42 are then connected to suitable insulated wires 16 which pass out of body 20 through a suitable opening in end plate 30. As shown in FIG. 1, wires 16 may be provided with some type of connector plug 18 for connecting wires 16 (and thus conductive coil 42) to a suitable source of electric current.

As illustrated in FIG. 2, a flexible conduit 60 passes through the central bore of end plate 30 and the central bore of the mandrel 40. The upstream end 62 of conduit 60 is secured within end plate 30 in some appropriate manner, such as, for example, by means of a conventional bushing 63. Conduit 60 may be formed of any suitable material, such as, for example, steel.

An armature 64 is secured to conduit 60 so as to lie adjacent mandrel 40. Armature 64 may, for example, be formed of steel and may be slidable secured on conduit 40 by friction or a suitable adhesive.

Armature 64 may have virtually any suitable geometric configuration. For example, armature 64 may be a substantially rectangular member as best seen in FIG. 1. It is presently preferred that a portion of armature 64 near mandrel 40 be diametrally enlarged, as shown in FIGS. 1 and 2. It is believed that the diametrally enlarged portion of armature 64 will assist the armature in conducting the magnetic induction current necessary for the proper operation of servovalve 10, as described in more detail below.

Two magnets 72 and 73 are positioned on opposite sides of armature 64, as shown in FIG. 2. Magnets 72 and 73 may, for example, be secured to body 20 by means of suitable magnet mounts 70. Significantly, one magnet 72 or 73 is configured and positioned such that it presents a north magnetic pole facing armature 64, while the other such magnet is configured and positioned so as to present a south magnetic pole facing armature 64. While magnets 72 and 73 could be formed of a wide variety of different materials, it is presently preferred that magnets 72 and 73 be formed of a rare earth metal material. It is believed that rare earth magnets facilitate making servovalve 10 small and lightweight due to their superior magnetic characteristics.

The downstream end of conduit 60 is preferably provided with a tip 66 which may be formed of any suitable material, such as, for example, brass. Tip 66 is secured to conduit 60 in some suitable manner, such as by means of friction or by means of a suitable adhesive. Importantly, tip 66 is configured as a fluid orifice or orifices through which fluid may flow from conduit 60.

The downstream end of body 20 is provided with a receiving plate 80 which may, for example, be formed of brass. Receiving plate 80 is secured within body 20 in some appropriate fashion, such as by means of solder or adhesive.

Receiving plate 80 has one or more fluid channels or groups of fluid channels 84 and 86 formed therein which terminate in openings or groups of openings 85 and 87, respectively (see FIG. 1). Channels 84 and 86 advantageously originate within and communicate with an arcuate or concave socket 82 which is formed in the surface of receiving plate 80 inside body 20. Preferably, the radius of curvature of socket 82 is substantially equal to the radius of curvature of the arcuate pathway over which the downstream end of conduit 60 moves during flexure, for reasons which will become more fully apparent from the discussion which follows.

Figure 3:
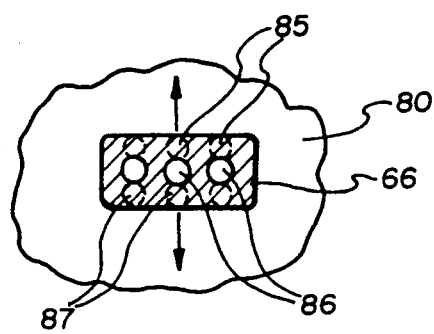
FIG. 3 is a top, graphical view of the tip and receiving plate configuration used with the apparatus of FIGS. 1 and 2.

FIG. 3 shows a top, graphical view of an exemplary configuration for the receiving plate 80 and tip 66. Here, the receiving plate 80 has two rows of three channels (or more) 85 and 87, and the tip 66 has one row of three channels or orifices 86 each positioned midway between a corresponding pair of channels 85 and 87 when the tip is in the nondeflected position.

Although there will generally be some distance between tip 66 and receiving plate 80, it is preferable to minimize this distance in order to reduce the amount of fluid leakage from between tip 66 and receiving plate 80. The distance between tip 66 and receiving plate 80 is not so small, however, that substantial frictional forces between the tip 66 and receiving plate 80 are present or that a lubricating fluid must be used in servovalve 10. Significantly, by providing receiving plate 80 with a socket 82, as described above, the distance between tip 66 and receiving plate 80 can also be maintained at a substantially constant minimal level during flexure of conduit 60.

When used in a fluid system, servovalve 10 is attached by means of nipple 32 to a source of pressurized fluid. The pressurized fluid then enters conduit 60 through nipple 32 and travels toward receiving plate 80.

Conductive coil 42 is connected by means of wires 16 and plug 18 to a source of electricity. As electrical current flows through coil 42, a magnetic current is induced through the center of coil 42 in accordance with well-known principles of electromagnetism. Because of this induced magnetic current, armature 64 which is adjacent one end of coil 42 will be magnetized as either a north magnetic pole or a south magnetic pole depending upon the direction of the electrical current in coil 42. As a result, armature 64 will be magnetically attracted toward either magnet 72 or magnet 73, and conduit 60 will be deflected either upwardly or downwardly in FIG. 2.

For example, the direction of the electrical current through coil 42 may cause armature 64 to be magnetized as a north magnetic pole. Thus, if magnet 72 is positioned so as to present a north magnetic pole facing armature 64 and magnet 73 is positioned so as to present a south magnetic pole facing armature 64, armature 64 will be magnetically repelled from magnet 72 and magnetically attracted toward magnet 73. As a result, conduit 60 will be deflected downwardly in FIG. 2. Conduit 60 could, of course, also be deflected upwardly in FIG. 2 in a similar fashion by simply reversing the direction of the electrical current in coil 42.

It will be readily appreciated that if conduit 60 is deflected upwardly in FIG. 2, fluid will flow through conduit 60 and through tip 66 into fluid channels 84. On the other hand, if conduit 60 is deflected downwardly in FIG. 2, fluid will flow through conduit 60 and through tip 66 into channels 86. Thus, the flow of fluid into fluid channels 84 and 86 may be selectively controlled by simply controlling the direction of the electrical current in coil 42 which determines the direction conduit 60 is deflected.

Advantageously, as mentioned above, by providing receiving plate 80 with a concave socket 82 which has a radius of curvature substantially equal to the radius of curvature of the pathway over which the downstream end of conduit 60 moves, a relatively close tolerance can be maintained between tip 66 and concave socket 82. As a result, the flow of fluid through conduit 60 can be virtually stopped by positioning conduit 60 in the nondeflected position, as illustrated in FIG. 2, such that the orifice formed by tip 66 lies between fluid channels 84 and 86. While some fluid leakage can still be expected, the fluid leakage will be minimal as compared with prior art jet pipe valves. In fact, the performance of servovalve 10 can approach that of conventional spool valves while being much less expensive and much easier to manufacture and maintain.

As noted above, there will likely be at least some fluid which leaks into the interior of body 20 from the orifice formed by tip 66. Such fluid may occasionally contain magnetized particles which could travel toward magnets 72 and 73 and become affixed thereto. It will be readily appreciated that such a condition could have a significant adverse effect upon the performance of servovalve 10.

In order to prevent magnetic particles from coming into contact with magnets 72 and 73, an appropriate filter may be provided around tip 66. For example, a conventional porous metal material may be provided around tip 66 to act as a filter for any magnetized particles in the fluid. Alternatively, a series of baffles 92 may be provided around tip 66, as shown in FIG. 2, and magnetic filters 93 may be positioned therebetween. As magnetized particles travel between baffles 92, magnetic filters 93 will trap such particles and prevent them from coming into contact with magnets 72 and 73.

As shown schematically in FIG. 2, servovalve 10 may be connected to a suitable actuator 12, if desired. Thus, by directing fluid through channel 84 in receiving plate 80, the pressurized fluid can be directed through channel 14 so as to cause extension of piston rod 13 of actuator 12. Fluid could thereafter be directed through channel 86 in receiving plate 80 to channel 15 which would cause piston rod 13 to be retracted.

Advantageously, an actuator 12 may be connected directly to servovalve 10 by means of a suitable sleeve (not shown). In such case, in order to facilitate sealing the sleeve around the downstream end 28 of body 20, an 0-ring 26 may be provided around body 20, as shown.

From the above discussion, it will be appreciated that the present invention provides a servovalve apparatus which can readily be used with high fluid flow rates and which can provide relatively high power output but which does not require the very tight tolerances of many prior art valve devices. It has, for example, been found that the servovalve apparatus of the present invention may easily be used with fluid flow rates within the range of from approximately one gallon per minute to approximately four gallons per minute. This is 10 to 40 times greater than the fluid flow rates typically used with conventional jet pipe valves.

The physical configuration of the servovalve apparatus of the present invention also makes it possible to construct the servovalve apparatus much smaller than many conventional valves. The small size and relatively light weight of the servovalve apparatus is also achieved in part due to the use of rare earth magnets within the servovalve apparatus.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A servovalve apparatus for use in fluid systems comprising
   a flexible conduit having an upstream end and a downstream end;

means for connecting a source of fluid to the upstream end of the flexible conduit;

a receiving plate positioned adjacent the downstream end of the flexible conduit, the receiving plate having at least one fluid channel formed therein;

an armature affixed to the flexible conduit;

a conductive coil surrounding at least a portion of the flexible conduit adjacent its upstream end for magnetizing the armature when electrical current is supplied to the coil;

a magnet assembly positioned at the side of the armature for selectively attracting or repelling the armature to deflect the conduit, depending upon the direction of electrical current supplied to the coil; and means for preventing magnetic particles from coming into contact with the magnetic assembly.

2. A servovalve apparatus as defined in claim 1 wherein the means for preventing magnetic particles from coming into contact with the magnet assembly comprises:

a plurality of baffles positioned between the downstream end of the flexible conduit and the magnet assembly; and at least one magnetic filter positioned in proximity to the baffles.

3. A servovalve apparatus for use in fluid systems comprising:

a flexible, resilient conduit having an upstream end and a downstream end;

means for connecting a source of fluid to the upstream end of the conduit;

a receiving plate positioned adjacent the downstream end of the flexible conduit, the receiving plate having a concave socket formed therein for receiving the downstream end of the flexible conduit, the concave socket having a radius of curvature which is substantially equal to the radius of curvature of the downstream end of the flexible conduit during flexure, and the receiving plate having at least one fluid channel formed therein which communicates with the concave socket;

an armature affixed to the flexible conduit;

a conductive coil surrounding at least a portion of the flexible conduit adjacent its upstream end for magnetizing the armature when electrical current is supplied to the coil;

a first magnet and a second magnet, said first and second magnets being positioned on substantially opposite sides of the flexible conduit, the first magnet being positioned such that a north magnetic pole faces the armature and the second magnet being positioned such that a south magnetic pole faces the armature; and wherein the armature is formed with two, generally oppositely facing, planar flats, each flat generally facing a respective one of the magnets.

4. A servovalve apparatus as defined in claim 3 further comprising an end plate connected to the upstream end of the flexible conduit, and wherein the means for connecting a source of fluid to the upstream end of the flexible conduit comprises a nipple affixed to the end plate which communicates with the flexible conduit.

5. A servovalve apparatus for use in fluid systems, comprising:

a substantially cylindrical body;

a flexible conduit positioned within the cylindrical body so as to be substantially coaxial with the longitudinal axis of the cylindrical body, the flexible conduit having an upstream end and a downstream end;

an end plate connected to the upstream end of the flexible conduit, the end plate having a nipple which communicates with the flexible conduit;

a mandrel surrounding at least a portion of the flexible conduit adjacent its upstream end;

an electrical conductor wound around the mandrel so as to form a conductive coil;

an armature affixed to the flexible conduit so as to be adjacent the mandrel, a portion of the armature near the mandrel being diametrically enlarged;

a first magnet and a second magnet, said first and second magnets being formed of a rare earth metal material and being positioned on substantially opposite sides of the flexible conduit, the first magnet being positioned such that a north magnetic pole faces the armature and the second magnet being positioned such that a south magnetic pole faces the armature;

a tip secured to the downstream end of the flexible conduit, the tip being configures as a fluid orifice which communicates with the flexible conduit;

a receiving plate positioned adjacent the downstream end of the flexible conduit, the receiving plate having a concave socket formed therein for receiving the tip secured to the downstream end of the flexible conduit, the concave socket having a radius of curvature which is substantially equal to the radius of curvature of the downstream end of the flexible conduit during flexure, and the receiving plate having at least one fluid channel formed therein which communicates with the concave socket; and means for preventing magnetic particles from coming into contact with the first and second magnets.

6. A servovalve apparatus as defined in claim 5 further comprising an actuator device secured to the body which is adapted to be controlled by means of fluid which is directed into the fluid channels in the receiving plate.

* * * * *